United States Patent [19]

Roncetti et al.

[11] Patent Number: 5,153,270
[45] Date of Patent: Oct. 6, 1992

[54] PROCESS FOR GRAFTING MALEIC ANHYDRIDE ONTO UNSATURATED POLYOLEFINIC ELASTOMERS BY MASS REACTION

[75] Inventors: Lucia Roncetti, Bologna; Viviano Banzi, Vigarano Mainarda, both of Italy

[73] Assignee: Ausimont S.r.l., Milan, Italy

[21] Appl. No.: 387,787

[22] Filed: Aug. 1, 1989

[30] Foreign Application Priority Data

Aug. 2, 1988 [IT] Italy .............................. 21616 A/88

[51] Int. Cl.$^5$ ........................ C08F 4/00; C08F 255/06
[52] U.S. Cl. .................................. 525/245; 525/285; 525/289; 525/315; 525/322; 525/324
[58] Field of Search ............................... 525/245, 285

[56] References Cited

U.S. PATENT DOCUMENTS

| | | | |
|---|---|---|---|
| 3,013,066 | 12/1961 | Alderson | 525/361 |
| 3,995,095 | 11/1976 | Short | 525/245 |
| 4,134,927 | 1/1979 | Tomoshige | 525/245 |
| 4,845,155 | 7/1989 | Dean | 525/285 |

FOREIGN PATENT DOCUMENTS

| | | | |
|---|---|---|---|
| 0037238 | 7/1964 | German Democratic Rep. | 525/245 |
| 38-22489 | 10/1963 | Japan | 525/245 |
| 44-02088 | 1/1969 | Japan | 525/245 |
| 46-06583 | 2/1971 | Japan | 525/245 |
| 46-14740 | 4/1971 | Japan | 525/245 |
| 62-104883 | 5/1987 | Japan | 525/245 |

OTHER PUBLICATIONS

Alderson et al., "Olefin-to-Olefin Addition Reactions", Journal of American Chemical Society, vol. 87, No. 24 (Dec. 29, 1965), pp. 5638-5645.
Cramer, "Transition Metal Catalysis Exemplified by Some Rhodium-Promoted Reactions of Olefins," Accounts of Chemical Research, vol. 1 (1968), pp. 186-191.
Abstract of German reference 2049937 published Oct. 1970.
"Principles of Polymer Chemistry" by Paul J. Flory, Cornell University Press, Ithaca, N.Y., 1953: Condensation Polymerization, pp. 74-79.
"Polymer Reactions", American Chemical Society Symposium Held at Miami Beach, Fla., Apr. 9-14, 1967, edited by E. M. Fettes, published by Interscience Publishers (John Wiley & Sons, Inc.): Critical Factors Affecting Chemical Reactions on Polymers, pp. 1-5.

Primary Examiner—Ana L. Carrillo
Assistant Examiner—Vasu S. Jagannathan
Attorney, Agent, or Firm—Stevens, Davis, Miller & Mosher

[57] ABSTRACT

Maleic anhydride is grafted onto unsaturated elastomeric terpolymers consisting of monomeric units coming from at least two different monomers having the formula $R-CH=CH_2$ ($R$ = hydrogen or an alkyl group containing from 1 to 6 carbon atoms) and from a conjugated or non-conjugated dienic monomer by mass reaction, which is carried out by heating at 120°-350° C. a mixture of said maleic anhydride with the terpolymer in the presence of a catalyst consisting of a compound having the formula:

$$M_nX_z$$

wherein:
M = a metal of group VIII of the periodic system, and in particular Rh and Ru;
X = a counterion,
N = valence of the counterion; and
Z = valence of the metal.

5 Claims, No Drawings

PROCESS FOR GRAFTING MALEIC ANHYDRIDE ONTO UNSATURATED POLYOLEFINIC ELASTOMERS BY MASS REACTION

DESCRIPTION OF THE INVENTION

The present invention relates to the preparation of functionalized olefinic elastomeric terpolymers by the grafting of maleic anhydride, which preparation is carried out by mass reaction.

The grafting of maleic anhydride onto olefinic polymers by mass reaction is known in the prior art.

According to U.S. Pat. No. 3,236,917, maleic anhydride is grafted onto ethylene/propylene copolymers by heating a mixture of the two components in the presence of an organic peroxide. This process presents the drawback of causing besides the graft of maleic anhydride, a partial cross-linking between the chains of the copolymer as well.

According to U.S. Pat. No. 3,884,882, one obtains adducts of maleic anhydride and terpolymers consisting of ethylene, an alpha olefin, and a non-conjugated dienic compound, by heating mixtures of terpolymer with the anhydride at temperatures ranging from 225° to 350° C. This process, while allowing one to obtain products having a low gel content, presents the drawback of requiring in the reaction a considerable excess of maleic anhydride to achieve the desired graft levels.

In accordance with the present invention it has now been discovered that, surprisingly, the grafting of maleic anhydride onto unsaturated olefinic polymers may be carried out by mass reaction, without incurring the above-mentioned drawbacks, by carrying out the reaction in the presence of a catalyst consisting of a compound of a metal of group VIII of the periodic system, having the formula $$M_n X_z$$

wherein:
M = a metal of group VIII of the periodic system;
X = a counterion;
n = valence of the counterion; and
z = valence of the metal.

The olefinic polymers which react in such a way with maleic anhydride are represented by unsaturated terpolymers consisting of monomeric units coming from at least two different monomers having the formula

R—CH=CH$_2$ wherein R = hydrogen or an alkyl group containing from 1 to 6 carbon atoms, and of lower amounts of monomeric units coming from a conjugated or non-conjugated diene.

Therefore the main object of the present invention consists in a process for carrying out the grafting of maleic anhydride onto olefinic polymers consisting or consisting essentially of arranging for the maleic anhydride to mass react with an unsaturated olefinic terpolymer consisting of monomeric units coming from at least two different monomers having the formula

R—CH=CH$_2$ (I)

wherein R = hydrogen or an alkyl group having from 1 to 6 carbon atoms and of lower amounts of a conjugated or nonconjugated dienic monomer, in the presence of a compound having the formula:

$$M_n X_z \qquad (II)$$

wherein:
M = a metal of group VIII of the periodic system;
X = a counterion;
n = valence of the counterion; and
z = valence of the metal.

The metal in the compounds having the formula (II) is preferably Rh or Ru, while the counterion consists of a halogen or of an NO$_3$ group.

Examples of utilizable compounds are RhCl$_3$, RhBr$_3$, RuCl$_3$, Rh(NO$_3$)$_3$. Among these compounds RhCl$_3$ is preferred.

Among the preferred olefinic polymers which may be used for the purpose of the present invention, may be cited ethylene-propylene conjugated or non-conjugated diene terpolymers, wherein the diene may be, for instance, 5-ethylidene, 2-norbornene; 1,4-hexadiene; dicyclopentadiene; 5-methylene, 2-norbornene; 1,3-butadiene.

The corresponding amounts of monomers in such copolymers are not critical; they may range over very wide limits, without impairing their usefulness in the process of this invention.

Preferred terpolymers are those consisting of ehtylene with at least an alpha-olefin comprised in formula (I), preferably propylene, and with at least one of the above-mentioned dienic monomers and comprising preferably, by weight, from 30 to 80% of ethylene and from 0.5 to 15% of dienic termonomer.

Terpolymers of ethylene with an alpha-olefin containing from 3 to 8 carbon atoms and at least one dienic monomer are well known in the prior art. Methods for their preparation are described for instance in U.S. Pat. Nos. 2,933,480; 2,962,451; 3,000,866; 3,093,620; 3,093,621; 3,063,973; 3,147,230; 3,154,528; 3,260,708.

The reaction between the above-described unsaturated olefinic polymer and maleic anhydride, in the presence of the compound having the formula (II) (catalyst) according to the invention may be carried out by any mass process in which one achieves a good mixing of the polymer with the other components, without any substantial formation of free radicals.

The mixing may be carried out for instance in a plastograph of the Brabender type or in an extruder, by feeding maleic anhydride in the molten state or in the form of a powder. The catalyst may be introduced in the form of a powder or in a masterbatch based on the reaction polymer or incorporated in the molten maleic anhydride. The amount of catalyst to be used may range from 0.001 to 0.1 g per 100 g of elastomeric polymer.

The reaction temperature may range from 120° to 350° C., but is preferably from 220° to 280° C.

The residence times of the reagents in the mixing phase at such temperatures generally, but not necessarily, range from 0.5 to 5 minutes, and thereby a polymer is obtained containing from 0.5 to 2.5% by weight of grafted maleic anhydride.

The grafted polymer obtained by the process according to this invention requires no substantial purification, as free maleic anhydride is present in said polymer in very low amount.

Upon extraction in xylene at 23° C., after having kept the reaction mixture at reflux temperature for 1 hour, an insoluble fraction comes out consisting of an irreversibly grafted polymer, which is always below 2% by weight based on the reaction raw product.

The following examples will be given to illustrate the present invention without limiting, however, the same.

According to such examples the following polymers are used:

- elastomer (A), consisting of an ethylene-propylene-ethylidene norbornene (ENB) terpolymer, containing, by weight, 40% of propylene and 3.5% of ENB, having a Mooney ML(1+4) viscosity at 100° C.=42; and
- elastomer (B), consisting of an ethylene-propylene-butadiene terpolymer, containing, by weight, 28% of propylene, and 1.2% of butadiene, having a Mooney ML (1+4) viscosity at 100° C.=32.

The amount of grafted maleic anhydride present in the washed polymer was calculated on the reaction products by acidimetry or IR spectroscopy. The washing of the raw reaction product was carried out by dissolving the polymer in xylene, by precipitating it again with acetone, then by filtering, and by washing the precipitate with acetone several times.

In all the examples the concentrations of the fed catalyst and maleic anhydride are referred to 100 parts by weight of elastomeric polymer.

EXAMPLES 1-2

Comparison Examples

Copolymer A was fed into a Brabender PLE 651 plastograph, heated to the temperature of 270° C., keeping the round number of the rotors equal to 20 rpm. When the mass reached the required temperature and the recorded stress was constant, the round number was increased to 60 rpm and powdered maleic anhydride (M.A.) was added. The mixture was then allowed to react for 5 minutes, after which it was discharged.

The content in anhydride was determined both on the raw mixture and on the washed polymer. The part insoluble in xylene at 23° C. was determined.

The conversion was calculated on the basis of the ratio between maleic anhydride in the washed product and fed maleic anhydride.

The amounts of the reagents and the results are reported in Table I.

EXAMPLES 3-6

Operation here was as in the preceding Examples (1-2), inserting however, at the time of addition of the monomer (maleic anhydride), the catalyst $RhCl_3$ in powder form.

The amounts of the reagents and the results are reported in Table I.

EXAMPLES 7-8

Comparison Examples

Copolymer B was loaded into a Brabender PLE 651 plastograph, heated to the temperature of 270° C., keeping the round number of the rotors at 20 rpm. After setting of the temperature and stress, the speed was increased to 60 rpm and powdered maleic anhydride was added.

The mixture was allowed to react for 5 minutes, after which it was discharged.

The amounts of the reagents and the results are reported in Table II.

EXAMPLES 9-12

Here operation was as in Examples 7-8, inserting however, at the time of addition of the monomer, the catalyst $RhCl_3$ in powder form.

The amounts of the reagents and the results are reported in Table II.

EXAMPLES 13-16

Operation here was as in Example 11, discharging however the mixture after different reaction times.

The amounts of the reagents and the results are reported in Table III.

EXAMPLES 17-19

Operating as in Example 12 using as catalyst $RhBr_3$, $Rh(NO_3)_3$ and $RuCl_3$ instead of $RhCl_3$, the amounts of the reagents and the results are as reported in Table IV.

TABLE I

|  | 1 | 2 | 3 | 4 | 5 | 6 |
|---|---|---|---|---|---|---|
| Catalyst (% by weight) | — | — | 0.1 | 0.1 | 0.05 | 0.001 |
| Fed maleic anhydride (%) | 1 | 2 | 1 | 2 | 1 | 1 |
| Maleic anhydride in the raw product (%) | 0.62 | 0.81 | 0.99 | 1.54 | 1.10 | 0.86 |
| Maleic anhydride in the product after washing (%) | 0.31 | 0.44 | 0.99 | 0.92 | 0.99 | 0.80 |
| Conversion (%) | 31 | 22 | 99 | 46 | 99 | 80 |
| Part insoluble in xylene at 23° C. (%) | 2 | 2 | 2 | 2 | 2 | 2 |

TABLE II

|  | 7 | 8 | 9 | 10 | 11 | 12 |
|---|---|---|---|---|---|---|
| Catalyst (% by weight) | — | — | 0.1 | 0.1 | 0.05 | 0.001 |
| Fed maleic anhydride (%) | 1 | 2 | 1 | 2 | 1 | 1 |
| Maleic anhydride in the raw product (%) | 0.62 | 0.56 | 1.11 | 1.85 | 1.17 | 1.11 |
| Maleic anhydride in the product after washing (%) | 0.37 | 0.37 | 1.11 | 1.54 | 1.10 | 1.11 |
| Conversion (%) | 37 | 28 | 100 | 77 | 100 | 100 |
| Part insoluble in xylene at 23° C. (%) | 2 | 2 | 2 | 2 | 2 | 2 |

TABLE III

| Influence of the reaction time | | | | |
|---|---|---|---|---|
|  | 13 | 14 | 15 | 16 |
| Time (min) | 1 | 2 | 3 | 4 |
| Fed maleic anhydride (%) | 1 | 1 | 1 | 1 |
| Maleic anhydride in the raw product (%) | 1.05 | — | — | 1.11 |
| Maleic anhydride in the product after washing (%) | 1.05 | 0.99 | 0.99 | 1.05 |
| Conversion (%) | 100 | 99 | 99 | 100 |

TABLE IV

|  | 17 | 18 | 19 |
|---|---|---|---|
| Catalyst | $RhBr_3$ | $Rh(NO_3)_3$ | $RuCl_3$ |
| Concentration of the catalyst (%) | 0.0017 | 0.0013 | 0.0010 |
| Fed maleic anhydride (%) | 1 | 1 | 1 |
| Maleic anhydride in the raw product (%) | 0.98 | 0.80 | 0.75 |
| Maleic anhydride in the | 0.98 | 0.67 | 0.69 |

TABLE IV-continued

|  | 17 | 18 | 19 |
|---|---|---|---|
| washed product (%) | | | |
| Conversion (%) | 98 | 67 | 69 |

EXAMPLES 20 AND 21

Comparative Examples

In these two examples the reaction is carried out between maleic anhydride and elastomer using benzoyl peroxide as radicalic initiator.

The elastomeric copolymer was fed into a plastograph type Brabender PLE 651, heated to 120° C. and working at 20 r/m. When the mass reached the required temperature and the recorded stress was constant, the round number was increased to 60 r/m, and maleic anhydride and peroxide were added. The mixture was allowed to react for 8 hours, after which it was discharged.

The amounts of reagents and the results obtained are reported in Table V. All the indicated amounts are expressed by weight.

TABLE V

|  | 20 | 21 |
|---|---|---|
| Types of elastomer | A | B |
| Peroxide concentration (%) | 0.4 | 0.4 |
| Fed maleic anhydride (%) | 1 | 1 |
| Maleic anhydride in the raw reaction product (%) | 1.11 | 0.11 |
| Maleic anhydride in the washed product (%) | 1.05 | 1.05 |
| Conversion (%) | 100 | 100 |
| Part insoluble in xylene at 23° C. (%) | 37 | 45 |

What is claimed is:

1. A process for grafting maleic anhydride onto unsaturated olefinic terpolymers consisting of monomeric units coming from at least two different monomers having the formula $CH_2=CH-R$, wherein $R=$hydrogen or an alkyl group containing form 1 to 6 carbon atoms, and of lower amounts of a dienic monomer, which process consists essentially in mass reacting maleic anhydride with the terpolymer at temperatures ranging from 120° C. to 350° C. in the presence of at least one compound having the formula:

$$M_n X_z.\qquad\qquad I$$

wherein

M = a metal of group VIII selected from the group consisting of rhodium and ruthenium of the periodic system;
X = a counterion;
n = valence of the counterion; and
z = valence of the metal.

2. A process according to claim 1, wherein the compound of formula I is selected from the class consisting of halides and nitrates of rhodium and ruthenium.

3. A process according to claims 1 or 2, wherein the terpolymer comprises ethylenic and propylenic monomeric units.

4. A process according to claims 1 or 2, wherein the terpolymer is an ethylene-propylene-1,3-butadiene terpolymer.

5. A process according to claims 1 or 2, wherein the terpolymer is an ethylene-ethylidene norbornene terpolymer.

* * * * *